June 15, 1965
R. T. WINDSOR ETAL
3,189,125
FLOW CONTROL
Filed Nov. 22, 1957
3 Sheets-Sheet 1
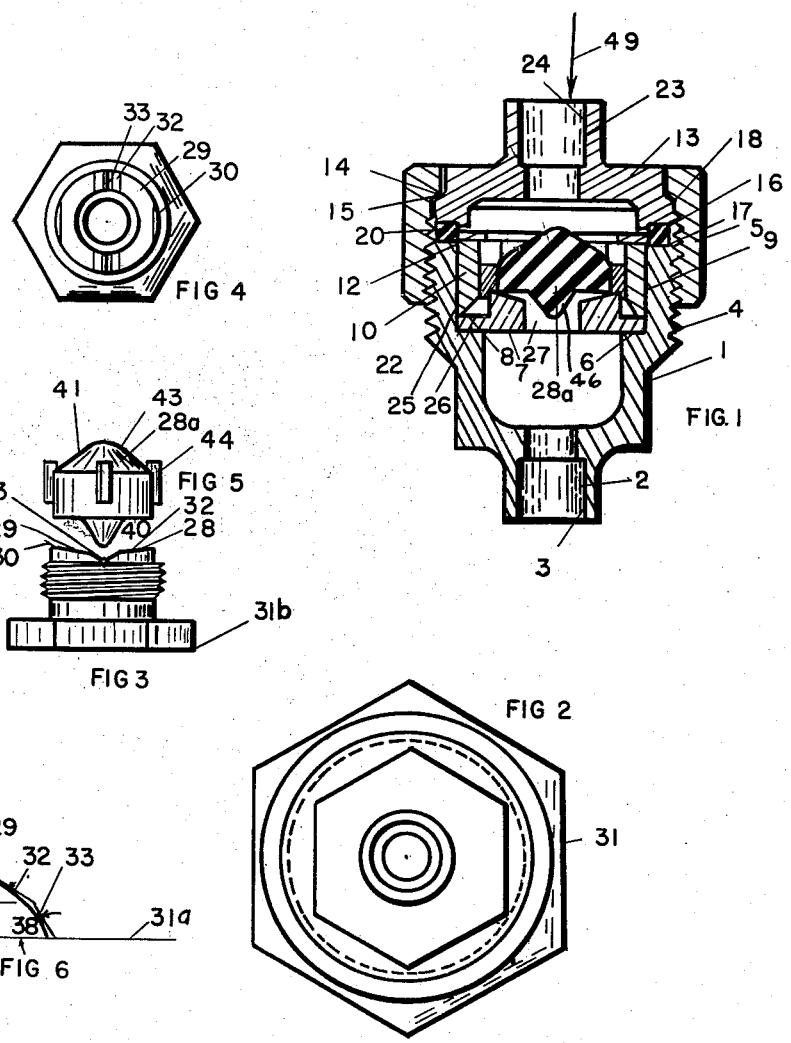
INVENTORS
RICHARD T. WINDSOR
ALVIN LODGE
BY
Charles L. Lovercheck June 15, 1965 R. T. WINDSOR ETAL 3,189,125
FLOW CONTROL
Filed Nov. 22, 1957 3 Sheets-Sheet 2

INVENTORS
RICHARD T. WINDSOR
ALVIN LODGE
BY
Charles L. Lorenchick
attorney

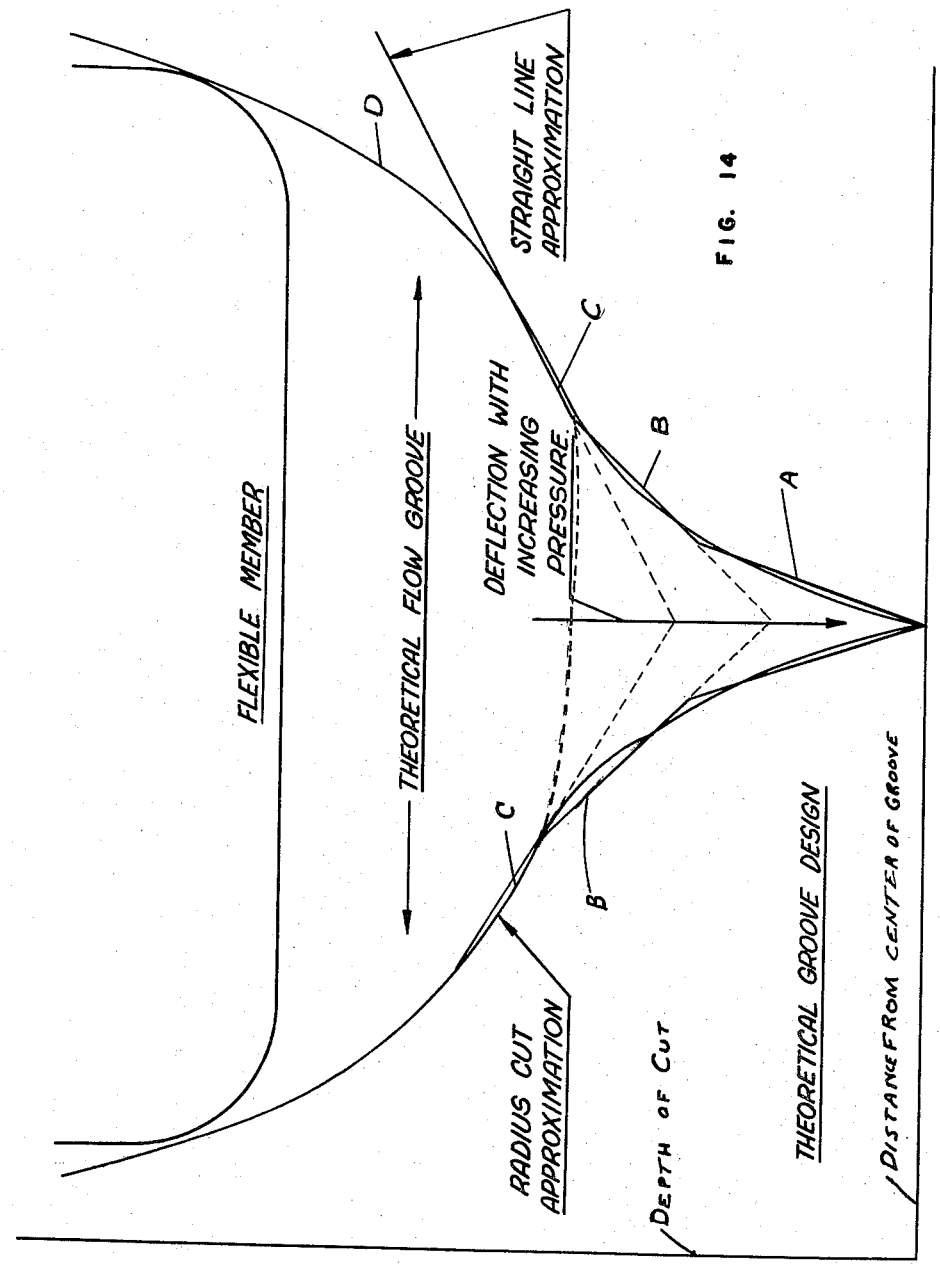

3,189,125
FLOW CONTROL
Richard T. Windsor and Alvin Lodge, Erie, Pa., assignors to Hays Manufacturing Company, Erie, Pa., a corporation of Pennsylvania
Filed Nov. 22, 1957, Ser. No. 698,175
6 Claims. (Cl. 138—43)

This invention relates to flow control devices and, more particularly, to devices for controlling the flow of fluid through a pipe line and conductor in order to provide a constant flow of fluid through the device.

This application is a continuation in part of patent application, Serial No. 415,270, filed March 4, 1954, now abandoned.

Flow control devices made according to prior inventions, for example, those shown in United States Patent Numbers 2,454,929, 2,460,647, and 2,554,790, rely on the deflection in bending of a resilient diaphragm to control the rate of flow of fluid through the device over a range of temperatures.

The flexible member of a flow control as disclosed herein can be regarded as approximating a simple beam loaded uniformly. The deflection of a beam resulting from a force tending to bend a given beam or member is greatly affected by variations in the thickness of the section due to manufacturing tolerances because of the deflection which is a function of the square of the thickness. As contrasted to this, the deflection resulting from a force tending to compress the flexible member in this design is little affected by variations in the thickness since it is a function of the thickness to the first power. Since the principal manufacturing variation is in the thickness, this design minimizes the flow variations due to manufacturing tolerances.

Prior devices have various disadvantages and limitations in that the bending deflections for a given stress vary considerably between various diaphragms and the bending characteristics also change with variation in temperature. Consequently, the flow rate cannot be readily subjected to normal engineering calculations. Furthermore, because of the configuration of these previous devices, it is difficult to machine them during manufacture. Also, prior devices of this type are frequently complicated in construction.

The basic design of the device disclosed herein, while quite simple in operation, depends upon the deflection of an elastic body in compression and an understanding of its operation requires a very intimate knowledge of the deflection characteristics of organic elastometers and of the dynamic behavior of fluids during flow through small orifices.

The problem breaks up into several parts:

(1) The deflection characteristics of the elastometer;
(2) Geometrical configuration of the control surface of the orifice plate; and
(3) Ranges of the various parameters, temperature, pressure, accuracy required, and direction of variation.

The problem will be complicated if the elastometer is permitted to operate in more than one mode of deflection; i.e. bending, tension, and compression. The stress-strain relationship of elastometers is less sensitive to manufacturing tolerances in the compression mode than in the tensional modes or combinations, as stated above. For this reason, the flexible control member has been designed so that its deflection is principally confined to the deformation or deflection strain resulting from compression forces. This is accomplished by making the flexible control member of sufficient thickness so that no bending will occur, by shaping the compression member so that the thickest section is at the center, thereby minimizing bending, and by designing the peripherally disposed centering lugs so as to strengthen the control member and hold it centered in the stream of fluid flowing therethrough. With this restraint, it becomes possible to commercially manufacture parts of a flow control to accomplish a desired rate of flow over a large range of temperatures and pressures to the required tolerances. By limiting the deflection to the compression mode, the dimensions of the control member may be permitted to vary within good commercial practise limits without affecting the flow control characteristics unduly, thus permitting mass production of the parts by conventional techniques.

The shape of the orifice plate controlled surface may be readily arrived at by the well-known Torricelli equation, $V\sqrt{2gh}$, or, in a more useful form:

since $Q = AV$
$$Q = CA\sqrt{P}$$

Where
$V$ = velocity
$h$ = head
$Q$ = flow rate
$A$ = area
$P$ = pressure
$C$ = constant It is evident from the above that an infinite area of orifice for zero pressure must be had and that the area of the orifice must change in a non-linear manner in order to maintain the desired flow rate as shown in the graph in connection with this application.

In a practical application of the theoretical curve, the contour of the orifice plate would be nearly impossible to machine economically by ordinary machine shop techniques and would be of doubtful value. Further, when the slope of the working surface of the orifice plate exceeds twenty degrees, the peripheral edges extend upwardly around the sides of the flexible member and there is a decided tendency for the flexible member to become wedged in the concave portion of the working surface and move in a "stick-slip" fashion. This sticking of the flexible member due to the upwardly disposed peripheral edges of the orifice plate has been overcome by cutting two grooves at right angles to each other in the surface of the orifice plate. Thus, the required low pressure area of the fluid path through the control is obtained without having to make the surface of the orifice plate in the shape of the full theoretical curve obtained by calculation. Rather, only the central, more linear portion of the curve can be used. This is of great value in some applications.

As evidenced by both the graph of the theoretical curve and a study of the actual performance of the device, it is possible to get a more accurate flow control over a range of pressure variations by using the well-known straight line approximation technique which is carried out by forming a number of straight surfaces tangent to the theoretical curve.

The temperature ranges which are contemplated to be handled with the device disclosed herein are from forty degrees Fahrenheit to one hundred eighty degrees Fahrenheit. This is a function of the flexible member and must be handled by selecting an elastometer having the desired stress-strain characteristics over the specified temperature range. The present compound uses a neoprene base although many other compounds can be devised for special applications, for example, a nylon orifice plate and a silicone flexible member for certain chemicals.

The pressure ranges which can be accommodated are limited on the low pressure end by the physical size of the device but there does not appear to be any limit to the high pressure performance of the device.

It is, accordingly, an object of this invention to overcome the above and other defects in prior flow control devices and, more particularly, it is an object of this invention to provide a flow control device which is simple in construction, economical to manufacture, and simple in application.

Another object of the invention is to provide a design for a flexible member of a flow control whereby the deflection is confined principally to the compression mode, thereby making it suitable for mass production under existing techniques.

Still another object of this invention is to provide a design for the orifice plate of a flow control whereby the theoretical curve can be approximated by a series of straight line surfaces which appear as simple external angles on the cutting edges of tools used to machine the surface on the plate, the surfaces being disposed so as to combine to the desired surface on the orifice plate so that the orifice plate surface can thus be readily machined, making it suitable for mass production under existing techniques.

Yet another object of the invention is to provide a design for the orifice plate of a flow control which permits the forming of the entire critical shape in one pass with a resultant gain in accuracy.

Still yet another object of the invention is to provide a design for the orifice plate of a flow control by the use of a radius cutter which is easily formed by existing techniques, as a series of straight angle cutters with which a larger portion of the theoretical curve is accurately machined, thereby enabling the flow control to work at much lower pressures.

Yet still another object of this invention is to provide a design for the orifice plate of a flow control whereby the use of two such previously described radius approximation grooves which are disposed at right angles to each other greatly improve the low pressure performance of the plate without the objectionable frictional effects which are associated with following the theoretical curve to obtain the desired flow with one radially disposed groove to the desired degree.

A further object of the invention is to provide a design for the orifice plate of a flow control which permits the use of simple, single angle, fly cutter bits to achieve a close-up approximation to a complex mathematical curve with a high degree of accuracy and precision on conventional machinery in mass production.

Still a further object of the invention is to provide a design for the flexible control member of a flow control whereby the flow is directed in a streamline manner through the flow control to reduce the pressures required for operation thereof.

It is a further object of the invention to provide a design for the flexible control member of a flow control whereby the high velocity portions of the stream are controlled and directed so as to greatly reduce turbulence and noise.

Yet a further object of this invention is to provide a design for the flexible control member of a flow control which, due to its configuration, is maintained loosely in the center of the device, thus increasing the precision of its operation and eliminating any tendency for uneven wearing of either the flexible member or the orifice plate of the control.

It is a still further object of this invention to provide a design for the flexible member of a flow control whereby the member is loosely restrained in such a manner as not to impede the flow but yet prevents the member from being dislodged upstream, thus making it safe from back flow and permitting its use in any position.

It is another object of the invention to provide a flow control device for controlling the rate of flow of fluid which depends upon the compressibility of a resilient material into a groove without bending thereof to regulate the control of the flow of fluid therethrough.

It is yet another object of this invention to provide a flow control device wherein the orifice between the resilient member and a rigid member has a predetermined shape and the resilient member is of such characteristic that it will be compressed therein in a predictable manner.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a longitudinal cross section view of a flow control device according to the invention;

FIG. 2 is a top view of the device shown in FIG. 1;

FIG. 3 is a side view of another embodiment of the flow control orifice plate showing the shape thereof;

FIG. 4 is a front view of the device shown in FIG. 3;

FIG. 5 is a side view of the resilient member which cooperates with the seat in FIG. 3 to control the flow of fluid through the device;

FIG. 6 is a curve showing the shape of a flow control member seat with the point where the right hand portion of the curve intersects the horizontal axis representing the center of the orifice plate;

FIG. 14 is a mathematical curve illustrating the calculation of a theoretical curve of a groove design for a flow control.

Figure 13:
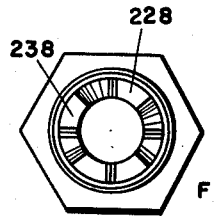
FIG. 13 is a top view of the orifice plate shown in FIG. 12.

Now with more specific reference to the drawings, a hollow flow control body member 1 is shown having an outlet bore 2 at one end thereof which is counterbored at 3 to receive the end of a pipe or other conduit. The body 1 is externally threaded at 4 to receive a union nut 5 and has a counterbore 9 terminating in a shoulder 6 therein adapted to engage an outwardly directed flange 8 of an orifice plate 7 which forms a partition in the hollow body 1. The orifice plate 7 is cylindrical and has a bore 27 therethrough and an integrally attached, outwardly directed flange 26 rests on the shoulder 6. A hollow cylindrical spacer 10 is disposed between the orifice plate 7 and the lower surface of a washer 12.

A head 13 has an upwardly directed, peripherally disposed shoulder 14 which is engaged by a corresponding inwardly directed shoulder 15 on the union nut 5. The nut 5 engages the threads 4 and engages the head 13 at 18. The nut 5 draws the head 13 down against a resilient packing washer 20 disposed between an end 17 of the body 1 and a shoulder 16 of the head 13. The head 13 is counterbored at 23 to receive the end of a pipe or suitable conduit at 24.

Figure 8:
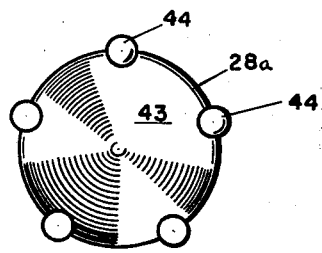
FIG. 8 is a top view of the resilient control member shown in FIG. 5 used in all embodiments of the invention herein.
Figure 9:
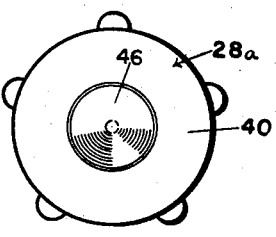
FIG. 9 is a bottom view of the resilient control member shown in FIGS. 5 and 8.

A control surface 28 of the cylindrical orifice plate 7 has an outwardly directed flange 31b shaped to engage a wrench and supports a resilient control member 28a which is more clearly shown in FIGS. 5, 8, and 9. The resilient control member 28a, comprising a block of resilient material, has a sufficient thickness relative to its lateral dimension so that when a pressure within the range contemplated is exerted thereon while it rests on the control surface 28 of the orifice plate 7, it will be deflected in compression only and no bending for all practical purposes will result. By "no bending" is meant inappreciable bending. The control surface 28 is shaped to simulate generally a theoretical curved surface represented by a line 30a which curves toward the central axis of the surface 28 and toward the outlet at a predetermined rate, depending upon the flow characteristic required for a given application.

Incremental surfaces 29, 30, 32, and 33 correspond approximately to the shape of the line 30a plotted as shown in FIG. 6. The incremental surface 30 of the control surface 28 is disposed at a very small angle to a transverse axis 31a of the device. The incremental surface 29 is disposed at a greater angle, and the incremental surface 32 is disposed at a much greater angle while the incremental surface 33 is disposed at a still greater angle. For example, the surface 30 is disposed at an angle 35 to the central axis 31a, the surface 29 may be disposed at an angle 36, the surface 32 may be disposed at an angle 37, and the surface 33 of the slot may be disposed at an angle 38. A projection of the incremental surfaces 29, 30, 32, and 33 would intersect the axis 31a. The angles included therebetween are indicated in FIG. 6 at 35, 36, 37, and 38.

The angles 35, 36, 37, and 38 are carefully calculated, depending upon the flow characteristics required. Since the resilient control member 28a is of a great thickness relative to its lateral dimension and since the rubber has a known compression strain characteristic over a considerable range of stress, the change of flow between a surface 40 of the resilient control member 28a and the control surface 28 of the orifice plate 7 can be very accurately determined for a given pressure. Also, provision may be made in the calculation of the angles 35, 36, 37, and 38 to offset any existing non-linear compression ratio of pressure to deflection of rubber or other resilient material which may be used over extended pressure ranges. The fluid pressure on an upper surface 41 of the resilient member 28a compresses the rubber against the control surface 28, thereby restricting the opening between the surface of the member 28 and the resilient member 28a.

The resilient member 28a is generally cylindrical in shape and has an upper surface 43 generally conical in shape with the apex of the cone at the center and a smoothly curved shape to avoid turbulence in the flow of fluid and, also, to reinforce the control member 28a against bending. Peripherally spaced, generally cylindrical ribs 44 are attached to the outer periphery of the resilient member 28a. The ribs 44 extend slightly above the outer edges of the top surface and outwardly of the outer cylindrical surface of the member 28a to center it in the flow control device and to insure that it is in aligned position with the surface 28.

Since the control member 28a rests loosely in the spacer 10, it will tend to rotate when the pressure flowing around the control member 28a is turned on, then off and on again, and the resilient member 28a, due to bending thereof, will assume a new position when pressure drops to zero and then increases. A conical protruding member 46 is spaced inwardly from the peripheral edge of the downstream end and assists in centering the device and extends down into a central opening 27 through the orifice plate 7, aiding in providing a smooth flow of fluid and avoiding turbulence in the fluid stream as well as centering the resilient member 28a.

With the counterbores 23 attached in a water line or a fluid line and the flow control assembled as shown in FIG. 1, when fluid is admitted in the direction of arrow 49, the fluid pressure on the upper surface 41 of the flow control device will react thereon to deform the resilient member 28a by compressive strain in the resilient member 28a to cause the engaging surface thereof to take a shape in conformance with the surface 28. This deformation of the resilient material will restrict the fluid flow path between the surface 40 of the control member 28a and the surface 28 and thereby control the flow rate. Since the compressibility of the rubber is known, the degree of restriction of the opening between the surface 40 and the surface 28 will change in a predictable manner, depending upon the design of the surface.

When flow through the device in the direction of the arrow 49 is interrupted, the resilient member 28a will move out of engagement with the surfaces 29, 30, 32, and 33 of the surface 28. Then when flow through the device is resumed, the member 28a will again be deformed progressively into engagement with the surfaces 29, 30, 32, and 33 as the pressure increases. The cylindrical member 7 will, in effect, embed itself in the resilient member 28a and, because of the substantial thickness thereof relative to its diameter, there will be no appreciable bending thereof. The integral conical ends of the cylindrical resilient member 28a will further eliminate any bending thereof. Since the control member 28a fits loosely in the spacer 10, it can rotate and will, therefore, not take a permanent deformation.

Figure 11:
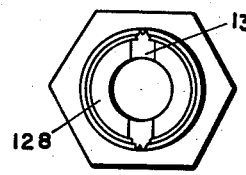
FIG. 11 is a top view of the orifice plate shown in FIG. 10.
Figure 10:
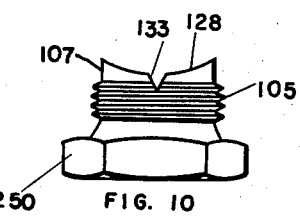
FIG. 10 is a side view of the orifice plate shown in the control shown in FIG. 7.
Figure 7:
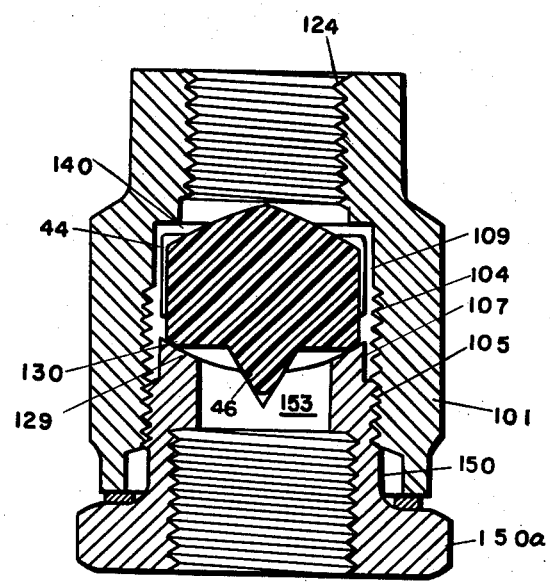
FIG. 7 is a cross sectional view of a flow control constituting another embodiment of the invention.

In the embodiment of the invention shown in FIGS. 7, 10, and 11, a flow control is shown having a body 101 and an orifice plate 107 received in the unthreaded part of a counterbore 109. The counterbore 109 has threads 104 formed therein. The inlet end of the body 101 is threaded at 124 to receive a fluid pipe or the like. The orifice plate 107 has a wrench receiving end 150a of a conventional hexagonal shape and a reduced size portion 150 threaded at 105 and received in the threaded portion 104 of the counterbore 109 in the body 101. The reduced size cylindrical portion 150 extends upwardly from a threaded portion 105 and terminates at the peripheral edges of a control face 128 for the control member 28a. An opening 153 is formed through the orifice plate 107 and the orifice plate 107, in effect, forms a partition in the body 101 with the opening 153 forming an aperture through the partition.

A lower peripheral edge 130 of the flat portion of the surface 40 of the control member 28a engages the control surface 128 with the conical member 46 extending downwardly into the opening 153. The ribs 44 of the control member 28a engage a shoulder 140 when the fluid pressure is reduced to limit the upward movement of the device during periods of low or zero pressure.

The control face 128 is formed in a predetermined shape and may be formed by one lateral pass of a suitable preformed milling cutter or by a plurality of fly cutters connected to one cutting member, each cutting a part of the shape of the control face 128. The face 128 is formed in the shape of two converging, smoothly curved surfaces with transverse slot 133 cut in the center thereof between the two surfaces.

The tool is preferably a rotatable tool having peripherally spaced, radially extending tools thereon. The tools will be of the type commonly used on a lathe with the distal end of the first tool having working surfaces in the shape defined by the line A in FIG. 14. The second tool will have cutting edges shaped as line B, the third tool having cutting edges C, and the fourth tool having a cutting edge in the form of a radius D. The dotted lines indicate the extension of the points of the tools. Because the points of each tool terminate in the cut of the preceding tool, point wear is not a factor and the groove can be cut with extreme accuracy, well within a manufacturing tolerance of ±.0001 inch. With ordinary formed cutters, it is not possible to cut the concave-convex surface groove such as can be cut by this process and tool.

It will be seen that since the control member engaging surface must increase in length when the member is compressed to bring all parts of the control member into engagement with the control surface, the resilient control member will be inclined to wedge itself down in between the two halves of the surface and, therefore, tend to stick therein. For this reason, in applications where a large volume of flow is required, especially at low pressures, instead of making curved surfaces 129 steeper and thus encountering the problem of the resilient control member sticking, it has been discovered that the orifice plate may also be cut transversely as in the embodiment of the invention shown in FIGS. 12 and 13 to provide two pairs of working surfaces at right angles to each other.

Figure 12:
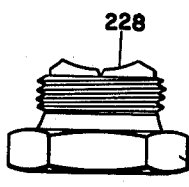
FIG. 12 is a side view of another embodiment of the orifice place.

In the embodiment of the invention shown in FIGS. 12 and 13, an orifice plate 207 which may be referred to as an orificed plate is similar to that shown in the other figures; however, in this embodiment, the control surfaces may be formed by two lateral cuts being taken by a milling cutter at right angles to each other, each of the cuts having the control surfaces 228 and 238 formed of a calculated or predetermined shape to give the flow control characteristic of fluid flow relative to fluid pressure desired. The two surfaces 228 and 238 can be formed by taking two lateral passes of a suitable shaped milling cutter, one pass being taken at right angles to the other. The orifice plate has an outwardly directed flange 250 with a wrench receiving outer periphery.

Since the ribs 44 are of sufficient thickness that no bending will take place in the control member but, rather, the surface which contacts the control surface 128 will be deflected or deformed by the compressing force exerted thereon by the control surface of the orifice plate, the deflection of the control member will be generally linear. This deflection is of such nature that the deflection thereof will restrict the passage between the control surface of the orifice plate and the control member so that the desired relationship of pressure to flow will be accomplished.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A flow control unit comprising a hollow body having an inlet and an outlet, a peripheral shoulder in said hollow body, said shoulder being in the form of an orifice plate, said orifice plate having a face within said body, said face having an opening therethrough, a radially disposed slot in said face, a control member made of flexible material supported on said face and overlying said slot, said control member being of such thickness relative to its width that substantially no bending of said control member will occur when in normal use fluid pressure is exerted on said control member, said control member being deformable by longitudinal fluid pressure exerted against said control member, thereby forcing said control member against said face and into said slot, thereby restricting the flow passage under said control member and through said slot in proportion to the pressure on said control member whereby fluid flow under said control member and through said slot is controlled, said face extending from said slot outwardly normal to the radial direction of said slot throughout the width of said face in said radial direction and sloping toward said inlet.

2. The flow control unit recited in claim 1 wherein a second said slot is formed in said face perpendicular to said first slot, and when in use, said control member is forced by said fluid into said second slot, thereby restricting the passage through said second slot.

3. The flow control unit recited in claim 1 wherein a portion of said face adjacent said slot slopes outwardly at a first rate and a portion of said face adjacent said first portion slotpes outwardly at a lesser rate.

4. The flow control unit recited in claim 1 wherein said face comprises a plurality of adjoining surfaces disposed to conform substantially to a curve.

5. The flow control unit recited in claim 1 wherein said slot and said face extend from said opening radially outwardly from opposite sides thereof.

6. The flow control unit recited in claim 1 wherein said orifice plate has a reduced size cylindrical portion extending into said hollow body, the inner end of said reduced size portion being defined by said face and said slot.

References Cited by the Examiner

UNITED STATES PATENTS

| | | | |
|---|---|---|---|
| 2,454,929 | 11/48 | Kempton | 138—45 |
| 2,460,647 | 2/49 | Miller | 138—43 |
| 2,477,607 | 8/49 | Hungate | 29—558 |
| 2,508,793 | 5/50 | Miller | 138—43 |
| 2,607,369 | 8/52 | Miller | 138—43 |
| 2,728,355 | 12/55 | Dahl | 138—45 |
| 2,762,397 | 9/56 | Miller | 138—43 |
| 2,765,529 | 10/56 | Bolender | 29—558 |
| 2,772,833 | 12/56 | Chace | 138—45 X |
| 2,829,674 | 4/58 | Segelhorst et al. | 138—45 |
| 2,878,836 | 3/59 | Binks | 138—45 |

EDWARD V. BENHAM, Primary Examiner.

LEWIS J. LENNY, Examiner.